(12) United States Patent
Glass

(10) Patent No.: US 7,003,698 B2
(45) Date of Patent: Feb. 21, 2006

(54) METHOD AND APPARATUS FOR TRANSPORT OF DEBUG EVENTS BETWEEN COMPUTER SYSTEM COMPONENTS

(75) Inventor: Richard J. Glass, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 485 days.

(21) Appl. No.: 10/184,744

(22) Filed: Jun. 29, 2002

(65) Prior Publication Data

US 2004/0078685 A1 Apr. 22, 2004

(51) Int. Cl.
*G06F 11/00* (2006.01)
(52) U.S. Cl. .............................. 714/30; 714/31; 714/37
(58) Field of Classification Search .................. 714/30, 714/31, 37, 39
See application file for complete search history.

(56) References Cited

U.S. PATENT DOCUMENTS

| | | | | |
|---|---|---|---|---|
| 5,469,542 A | * | 11/1995 | Foster et al. ................. | 709/224 |
| 6,065,078 A | * | 5/2000 | Falik et al. .................. | 710/100 |
| 6,598,177 B1 | * | 7/2003 | Jones et al. ................... | 714/30 |
| 6,772,369 B1 | * | 8/2004 | Smith et al. .................. | 714/31 |
| 6,823,224 B1 | * | 11/2004 | Wood et al. .................. | 700/87 |
| 2003/0033559 A1 | * | 2/2003 | Williams ..................... | 714/39 |
| 2004/0107383 A1 | * | 6/2004 | Bouchier et al. .............. | 714/4 |

\* cited by examiner

*Primary Examiner*—Robert Beausoliel
*Assistant Examiner*—Yolanda L Wilson
(74) *Attorney, Agent, or Firm*—Blakely, Sokoloff, Taylor & Zafman LLP

(57) ABSTRACT

Debug information is delivered over a general purpose interface. The debug information is delivered in packet format. These packets are referred to as Debug Event Packets (DEP). The debug event packets include a number of debug event bits that if set denote the occurrence of run-time programmable (selectable) debug events. The debug information packet also may include a debug parameter byte that allows one device to pass extra debug information to another device. The debug parameter byte may be associated with one of the debug event bits. The transfer of the debug event packets occurs in-band.

23 Claims, 5 Drawing Sheets

| Byte 0 | Byte 1 | Byte 2 | Byte 3 | Byte 4 | Byte 5 |
|--------|--------|--------|--------|--------|--------|
| Type | Debug Event [7:0] | Debug Event [15:8] | Debug Parameter | CRC | |

Figure 3

METHOD AND APPARATUS FOR TRANSPORT OF DEBUG EVENTS BETWEEN COMPUTER SYSTEM COMPONENTS

FIELD OF THE INVENTION

The present invention pertains to the field of semiconductor devices. More particularly, this invention pertains to the field of communicating debugging information between computer system components.

BACKGROUND OF THE INVENTION

In many advanced computer system components, powerful debug mechanisms are implemented to detect various internal debug related events, to select appropriate ones for analysis by other on-chip mechanisms, and to use results to trigger internal responses. These response mechanisms, such as forcing various error and throttling conditions, forcing freezing/breaking, and others, are critical to a variety of debug purposes.

It is often advantageous to pass debug information between components in a computer system. Prior computer systems have used a limited number of dedicated signal lines to pass debug information between computer system components. In these prior systems, each of the components participating in the sharing of debug information must dedicate one or more signal pins to passing debug information. The limited number of signal lines restricts the amount of debug information that can be passed between components. The dedicated signal pins result in increased component packaging costs.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIG. 3 is a diagram of a debug event packet.

DETAILED DESCRIPTION

In general, the embodiments described below involve passing debug information between components in a computer system. The debug information is delivered over a general purpose interface. For these example embodiments, the debug information is delivered in packet format. These packets are referred to as Debug Event Packets (DEP). The debug event packets include a number of debug event bits that if set denote the occurrence of programmable (selectable) debug events. The debug information packet also may include a debug parameter byte that allows one device to pass extra debug information to another device. The debug parameter byte may be related to one of the set debug event bits. The transfer of the debug event packets occurs in-band. That is, the transfer of the debug event packets occurs as a normal part of the general purpose interface protocol. By using the general purpose interface to deliver debug information, no extra pins are used and a significant amount of debug information can be passed between system components. Also, the use of the general purpose interface protocol enables components manufactured by different vendors to pass debug information back and forth. Debug event packets should normally be given high priority for transmission so that they are delivered with low latency from end to end.

As used herein, the term "general purpose interface" is meant to include interfaces that are not used solely to pass debug information, but are instead used to pass a wide range of data and/or instructions between components. For example, the types of data and/or instructions that might be delivered over a general purpose interface may include information delivered to or retrieved from memory devices or peripheral components.

Figure 1:
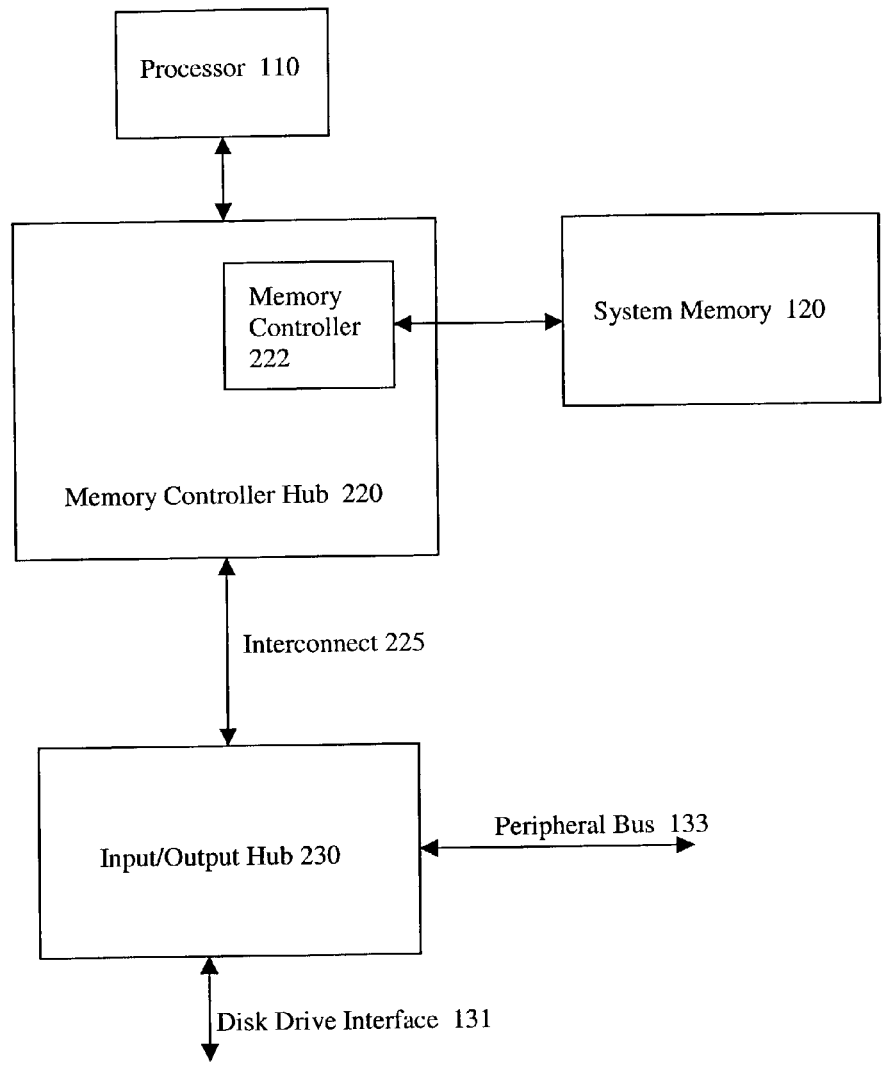
FIG. 1 is a block diagram of a computer system including a memory controller hub coupled to an input/output hub via an interconnect.

FIG. 1 is a block diagram of an example computer system 100 including a memory controller hub 220 coupled to an input/output hub 230 via an interconnect 225. The memory controller hub 220 includes a memory controller 222 that is coupled to a system memory 120. The memory controller hub 220 provides communication between a processor 110 and the system memory 120 and also between the processor 110 and the input/output hub 230. The memory controller hub 220 further provides communication between the input/output hub 230 and the system memory 120. The input/output hub 230 provides interfaces to a peripheral bus 133 and a disk drive interface 131.

As will be seen in more detail below, the memory controller hub 220 and the input/output hub 230 communicate internal debug information with each other over the interconnect 225.

Figure 2:
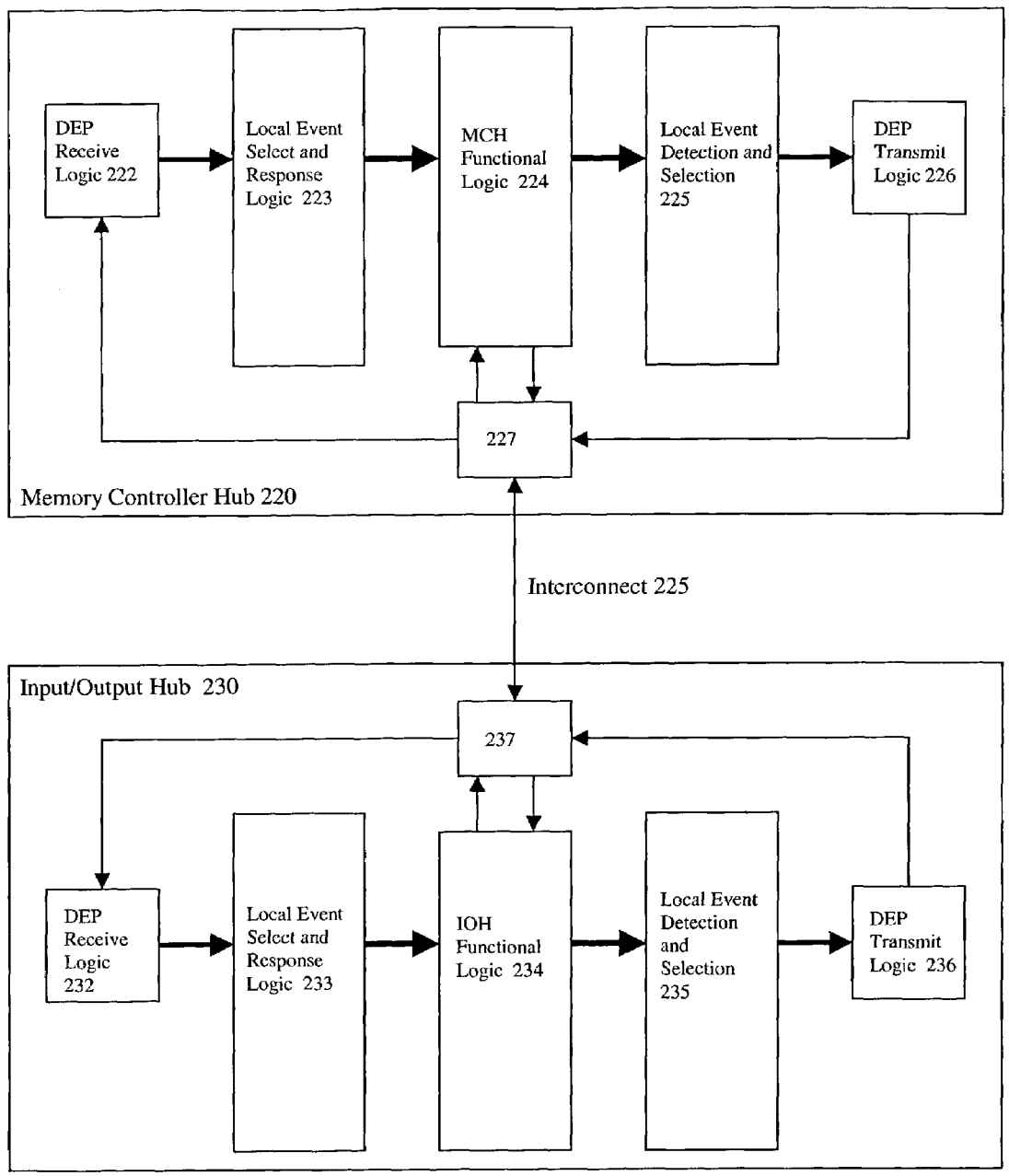
FIG. 2 is a block diagram of the memory controller hub and the input/output hub.

FIG. 2 is a block diagram of the memory controller hub 220 and the input/output hub 230 coupled by the interconnect 225. The memory controller hub 220 includes an interface unit 227 that is coupled to the interconnect 225 as well as to various units within the memory controller hub 220.

The memory controller hub 220 also includes a number of core functional units that are represented in FIG. 2 by the memory controller hub (MCH) functional logic 224. The MCH functional logic 224 is monitored by a local event detection and selection unit 225 for the occurrence of any of a wide variety of debug events. Some of the types of activities that may be sensed include, but are not limited to: bus or link error detection (value or parity/ECC/CRC errors, protocol violations, timeouts, etc.); transaction buffer/queue reaching a programmable threshold; events forcing bus/link throttling; transaction retry events; performance/debug monitor counters reaching selected thresholds or overflow; debug events received from other buses/links (for local application or for pass through to another device); parameterized pattern match of selected internal control state machine bits or key fields of internal control variables; explicit assertion of debug events via software writes to control registers; and other device specific events useful as stimuli for local or remote debug mechanisms.

The debug events to be sensed by the local event detection and selection unit 225 may be run-time programmable in order to meet specific debug needs. This may be accomplished using JTAG (Joint Test Action Group, IEEE 1149.1) accesses and/or software accesses to dedicated device debug configuration registers (not shown).

The local event detection and selection unit 225 detects the occurrence of the selected debug events and in conjunction with a debug event packet (DEP) transmit logic unit 226 forms a debug event packet. The debug event packet includes a number of debug event bits. Each of these bits, when set, indicate a detected debug event. The debug event packet may also include a debug parameter byte that can be used to communicated additional information associated with one of the debug event bits.

Once the debug event packet is formed, the packet is transmitted through the interface unit 227 over the interconnect 225 to the input/output hub 230. When a debug event packet is received by the input/output hub 230 over the interconnect 225, it is delivered by an interface unit 237 to a DEP receive logic unit 232. The DEP receive logic unit 232 translates the information contained in the debug event packet into signal pulses that are passed on to the local event select and response logic unit 233. In the event that the debug event packet includes a debug parameter byte, the DEP receive logic 232 passes the byte along to the local event select and response logic unit 233. The local event select and response logic unit 233 is coupled to any of a number of functional units within the input/output hub 230 represented in FIG. 2 by an input/output hub (IOH) functional logic 234.

The local event select and response logic unit 233 is a run-time programmable unit that can be configured to respond to debug event pulses delivered by the DEP receive logic 232 in a variety of ways. Some event driven debug mechanisms (responses) include, but are not limited to: Arm/Start/Stop/Disarm forcing errors of particular types at key points along internal pipelines such as corrupt specific value/parity/CRC (Cyclic Redundancy Check)/ECC (Error Correcting Code) bits, force specific types of protocol violations (value omissions, duplications, header field values out of valid range or reserved, etc.), force controlled delay of message transmission or internal handshakes in order to force system timing perturbations up to and including timeouts, etc.; Arm/Start/Stop/Disarm altered mode/behavior of logic at key points along internal pipelines and control logic blocks or for whole chip such as freeze/unfreeze of specified types or all transactions handling to allow extraction of device state for analysis, enter/exit device specific test modes, temporary change of selected thresholds determining device response strategies/priorities (timeout periods, retry maximum counts, error rate tolerance thresholds, etc.); Arm/Start/Stop/Disarm performance/debug information gathering mechanisms such as event counters and parameterized sequence detectors, statistics accumulators monitoring selected/parameterized local logic functions (bus/link transaction transmissions and receptions, internal transfer of transactions between functional units, etc.), internal snapshot or multi-record trace mechanisms able to capture history/sequence by recording raw or abstracted information appearing on monitored key nodes; and selective transmission of local or received events to "adjacent" devices in order to deliver events to the location where they can be applied. External tools monitoring the communications on interconnect (225) can be programmed to recognize debug events sensed internal to either of the components in order to trigger various responses, including, but not limited to, framing capture of traced link.

In addition to the units previously mentioned, the memory controller hub 220 includes a debug event packet (DEP) receive logic unit 222. The DEP receive logic unit 222 receives input from the interface unit 227 and delivers output to a local event select and response logic unit 223. The local event and response logic unit 223 provides output to the memory controller hub (MCH) functional logic unit 224. The input/output hub 230 includes, in addition to the previously discussed units, a local event detection and selection unit 235 and a DEP transmit logic unit 236. These additional units permit the input/output hub to communicate debug event information to the memory controller hub 220 in the same manner as that discussed above in the case where the memory controller hub communicates debug event information to the input/output hub 230.

Note that debug events transported across the interconnect 225 in the Debug Event Packets are generic as compared to the component specific events selected at the source and the generic transported debug events are applied to component specific response mechanisms in the receiving device. It is an intended advantage that the debug events transported are genericized so that neither device has to have prior knowledge of the nature of the remote source or destination of events. This facilitates generic event exchange between multiple vendor components.

FIG. 3 is a diagram of one embodiment of a debug event packet. For this example embodiment, the debug event packet includes 6 bytes of information. Byte 0 comprises a type field that identifies the packet as a debug event packet.

Bytes 1 and 2 include sixteen debug event bits. Each of these bits is associated with a debug event. A value of "1" for this example in one of these bit locations indicates that the associated debug event has been detected.

Byte 3 comprises a field that can transfer a debug parameter byte. The debug parameter byte may contain information associated with one of the debug event bits.

Bytes 4 and 5 include sixteen bits used for CRC error checking.

Figure 4:
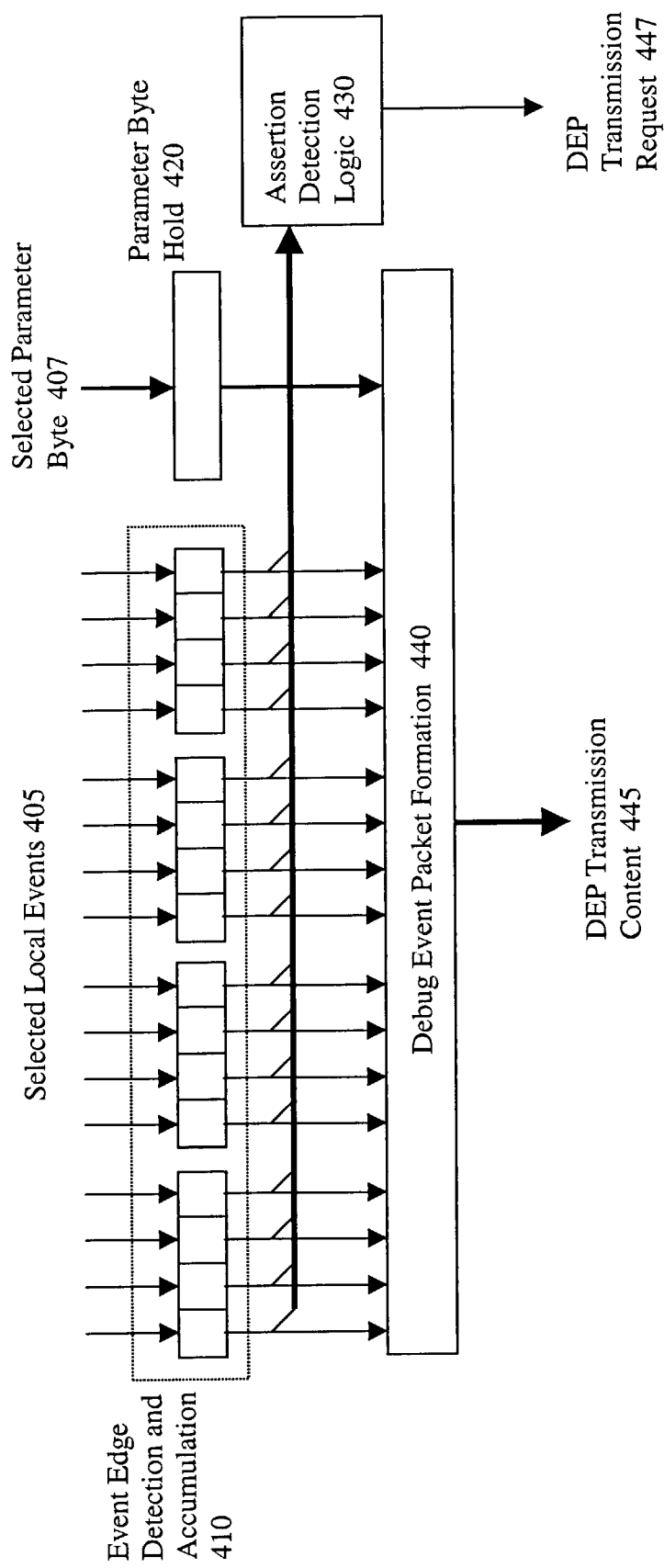
FIG. 4 is a block diagram of a unit that detects debug events and forms debug event packets for transmission.

FIG. 4 is a block diagram of a unit that detects debug events and forms debug event packets for transmission. The unit of FIG. 4 corresponds to a portion of the local event detection and selection units 225 and 235 and to the DEP transmit logic units 226 and 236 of FIG. 2. Selected local event signals 405 are received by an event edge detection and accumulation unit 410. For this embodiment, events are signaled by a transition from one logical state to another. The transition edges are detected and accumulated by the unit 410. A selected parameter byte 407 may be received by a parameter byte hold register 420.

As debug events are detected, a debug event packet is formed in the debug event packet formation unit 440. An assertion detection logic unit 430 detects when any debug events are detected. The assertion detection logic unit 430 issues a DEP transmission request 447. Detected debug events continue to be accumulated and reflected in the formed debug event packet until the debug event packet is transferred as DEP transmission content 445 to an interface unit.

In the event that more than one debug parameter byte needs to be communicated, multiple debug event packets may be transferred.

Figure 5:
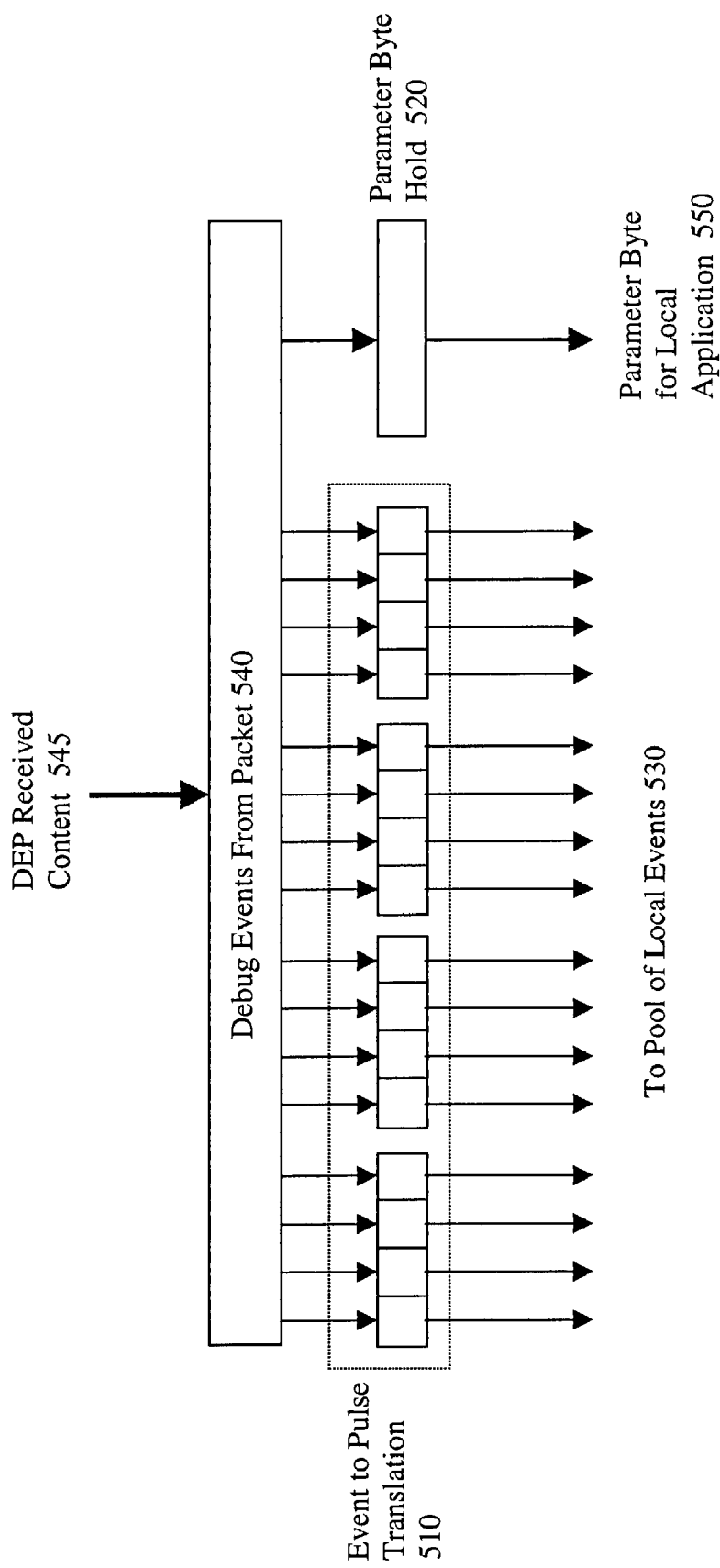
FIG. 5 is a block diagram of a unit that receives debug event packets and translates the debug events into pulses.

FIG. 5 is a block diagram of one embodiment of a unit that receives debug event packets and translates the debug events into pulses. This unit may be implemented as part of the DEP receive logic units 222 and 232 of FIG. 2. A debug event packet is received from an interface unit as DEP received content 545. A debug events from packet unit 540 receives the packet and delivers the debug event bit information to an event to pulse translation unit 510. For each of the asserted debug event bits, a corresponding signal pulse is generated and delivered to a pool of local events 530. Debug parameter byte information is temporarily stored in a parameter byte hold register 520 and is then made available to local applications (as represented by the parameter byte for local application 550).

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:
   an interface unit to transmit a debug event packet over a general purpose interconnect;
   logic to detect and accumulate any of a plurality of debug event assertions;
   logic to detect that at least one debug event assertion has been accumulated and to request transmission of the debug event packet; and
   an arbitration unit to arbitrate between the request for transmission of the debug event packet and requests for transmission of other types of packets via the general purpose interconnect, wherein the request for transmission of the debug event packet is assigned a priority higher than that of any other transmission request.

2. The apparatus of claim 1, wherein the debug events are run-time selectable.

3. The apparatus of claim 1, wherein the debug event packet includes a type field that identifies the packet as a debug event packet.

4. The apparatus of claim 3, wherein the type field is eight bits in width.

5. The apparatus of claim 3, wherein the debug event packet includes a debug event field.

6. The apparatus of claim 5, wherein the debug event field is 16 bits in width.

7. The apparatus of claim 5, wherein the debug event packet includes a debug parameter field.

8. The apparatus of claim 7, wherein the debug parameter field is eight bits in width.

9. An apparatus, comprising:
   a local event detection and selection unit to detect the occurrence of debug events; and
   a debug event packet transmit logic unit, coupled to the local event detection and selection unit, to generate a debug event packet having one or more bits each indicating a detected debug event, wherein a request for transmission of the debug event packet is assigned a priority higher than that of any other transmission request; and
   an interface unit coupled to the device event packet transmit logic.

10. The apparatus of claim 9, wherein the local event detection and selection unit includes an event edge detection and accumulation unit.

11. The apparatus of claim 10, wherein the local event detection and selection unit further includes a parameter byte hold register.

12. The apparatus of claim 11, wherein the local event detection and selection unit further includes a debug event packet formation unit.

13. An apparatus, comprising:
   a debug event packet receive logic unit coupled to an interface unit to translate to receive a debug event packet and to translate the debug event packet into signal pulses, wherein a request for transmission of the debug event packet is assigned a priority higher than that of any other transmission request; and
   a local event select and response unit coupled to the debug event packet receive logic unit.

14. The apparatus of claim 13, wherein the local event select and response unit includes an event to pulse translation unit.

15. A system, comprising:
   a first device including an interface unit to transmit a debug event packet over a general purpose interconnect; and
   a second device coupled to the first device via the general purpose interconnect, the second device including:
      an interface unit coupled to the general purpose interconnect and the interface unit to receive the debug event packet;
      a debug event packet receive logic unit coupled to the interface unit to receive the debug event packet and to translate the debug event packet into signal a pulses, wherein the request for transmission of the debug event packet is assigned a priority higher than that of any other transmission request;
      a local event select and response unit coupled to the debug event packet receive logic unit.

16. The system of claim 15, wherein the first device further includes logic to detect and accumulate any of a plurality of debug event assertions.

17. The system of claim 16, wherein the debug events are run-time selectable.

18. The system of claim 17, wherein the first device further includes logic to detect that at least one debug event assertion has been accumulated and to request transmission of the debug event packet.

19. The system of claim 18, wherein the first device further includes an arbitration unit to arbitrate between the request for transmission of the debug event packet and requests for transmission of other types of packets.

20. A method, comprising:
   forming a debug event packet at a first device;
   arbitrating between a request for transmission of the debug event packet and requests for transmission of other types of packets via a general purpose interconnect, wherein the request for transmission of the debug event packet is assigned a priority higher than that of any other transmission request; and
   transmitting the debug event packet over the general purpose interconnect from the first device to a second device.

21. The method of claim 20, wherein forming a debug event packet includes detecting and accumulating at least one debug event assertion in the first device.

22. The method of claim 21, further including selecting a plurality of local debug events associated with the first device.

23. The method of claim 22, wherein selecting a plurality of local debug events includes run-time programming of a configuration register.

* * * * *

UNITED STATES PATENT AND TRADEMARK OFFICE
CERTIFICATE OF CORRECTION

| | |
|---|---|
| PATENT NO. | : 7,003,698 B2 |
| APPLICATION NO. | : 10/184744 |
| DATED | : February 21, 2006 |
| INVENTOR(S) | : Glass |

Page 1 of 1

It is certified that error appears in the above-identified patent and that said Letters Patent is hereby corrected as shown below:

In column 6, at line 24, delete "a".
In column 6, at line 25, delete the first occurrence of "the" and insert --a--.

Signed and Sealed this

Fourth Day of December, 2007

JON W. DUDAS
*Director of the United States Patent and Trademark Office*